(12) United States Patent
Krywaniuk

(10) Patent No.: US 8,296,450 B2
(45) Date of Patent: Oct. 23, 2012

(54) DELEGATED NETWORK MANAGEMENT SYSTEM AND METHOD OF USING THE SAME

(75) Inventor: Andrew Simon Krywaniuk, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 802 days.

(21) Appl. No.: 11/385,117

(22) Filed: Mar. 21, 2006

(65) Prior Publication Data

US 2007/0226358 A1 Sep. 27, 2007

(51) Int. Cl.
*G06F 15/16* (2006.01)
(52) U.S. Cl. ........................ 709/229; 709/227
(58) Field of Classification Search .................. 709/203, 709/219, 223–224; 707/100–101; 370/322, 370/328
See application file for complete search history.

(56) References Cited

U.S. PATENT DOCUMENTS

| | | | |
|---|---|---|---|
| 6,832,247 B1 | 12/2004 | Cochran et al. | |
| 7,433,943 B1* | 10/2008 | Ford | 709/223 |
| 2003/0028624 A1* | 2/2003 | Hasan et al. | 709/220 |
| 2005/0235360 A1* | 10/2005 | Pearson | 726/23 |
| 2006/0179126 A1* | 8/2006 | Fujino et al. | 709/219 |
| 2007/0055674 A1* | 3/2007 | Sunada | 707/10 |
| 2010/0058057 A1* | 3/2010 | Sutherland et al. | 713/168 |

* cited by examiner

*Primary Examiner* — Kevin Bates
*Assistant Examiner* — Kevin Mai
(74) *Attorney, Agent, or Firm* — Schwegman Lundberg & Woessner, P.A.

(57) ABSTRACT

A method for providing a management function requested by a user that uses a managed device includes establishing a session on a managed device in response to a user logging into an account on the managed device, establishing a delegated management session on a management device, the delegated management session corresponding to the session on the managed device, receiving a management message on the management device, the management message being related to a management function requested by the user, and in response to the received management message, performing the management function using the management device.

19 Claims, 8 Drawing Sheets

DELEGATED NETWORK MANAGEMENT SYSTEM AND METHOD OF USING THE SAME

FIELD

The field of the application relates to systems and methods for managing a device over a network.

BACKGROUND

A gateway product, such as a firewall, performs many important functions. One important function is policy enforcement. Policy enforcement performed by a gateway product may include, for examples, source verification, destination verification, user authentication, anti-virus, content scanning, content detection, and intrusion detection.

Because much resource is utilized by firewalls to perform policy enforcement, existing firewalls may not have the necessary resource to provide management services, such as log analysis and report generation, web GUI for management, and cross-validation of configuration parameters. In some cases, the firewall is not even set up to provide management services or certain functions requested by a user. Although a separate device from the firewall may be used to provide certain functions not available from the firewall, such separate device is usually not associated with the firewall, and access of such device may require an administrator to manually perform a log-on procedure. As such, use of such separate device is inconvenient.

SUMMARY

In accordance with some embodiments, a management system for providing management function includes a managed device configured to provide a first management service in response to a user logging onto an account on the managed device using a client device, and a management device configured to provide a second management service, wherein the managed device is configured to redirect the client device to the management device when the user logs onto the account, thereby providing the first management service, and the management device is configured to perform a management function associated with the managed device to thereby provide the second management service.

In accordance with other embodiments, a method for providing a management function requested by a user that uses a managed device includes establishing a session on a managed device in response to a user logging into an account on the managed device, establishing a delegated management session on a management device, the delegated management session corresponding to the session on the managed device, receiving a management message on the management device, the management message being related to a management function requested by the user, and in response to the received management message, performing the management function using the management device.

In accordance with other embodiments, a computer-program product having a medium, the medium having a set of instructions readable by a processor, wherein an execution of the instructions by the processor causes a process to be performed, the process includes establishing a session on a managed device in response to a user logging into an account on the managed device, establishing a delegated management session on a management device, the delegated management session corresponding to the session on the managed device, receiving a management message on the management device, the management message being related to a management function requested by the user, and in response to the received management message, performing the management function using the management device.

In accordance with other embodiments, a system for providing a management function requested by a user that uses a managed device includes means for establishing a session on a managed device in response to a user logging into an account on the managed device, means for establishing a delegated management session on a management device, the delegated management session corresponding to the session on the managed device, means for receiving a management message on the management device, the management message being related to a management function requested by the user, and means for performing the management function using the management device in response to the received management message.

Other aspects and features of the embodiments will be evident from reading the following description of the embodiments.

BRIEF DESCRIPTION OF THE DRAWINGS

The drawings illustrate the design and utility of embodiments of the application, in which similar elements are referred to by common reference numerals. In order to better appreciate how advantages and objects of various embodiments are obtained, a more particular description of the embodiments are illustrated in the accompanying drawings. Understanding that these drawings depict only typical embodiments of the application and are not therefore to be considered limiting its scope, the embodiments will be described and explained with additional specificity and detail through the use of the accompanying drawings.

DETAILED DESCRIPTION

Figure 1:
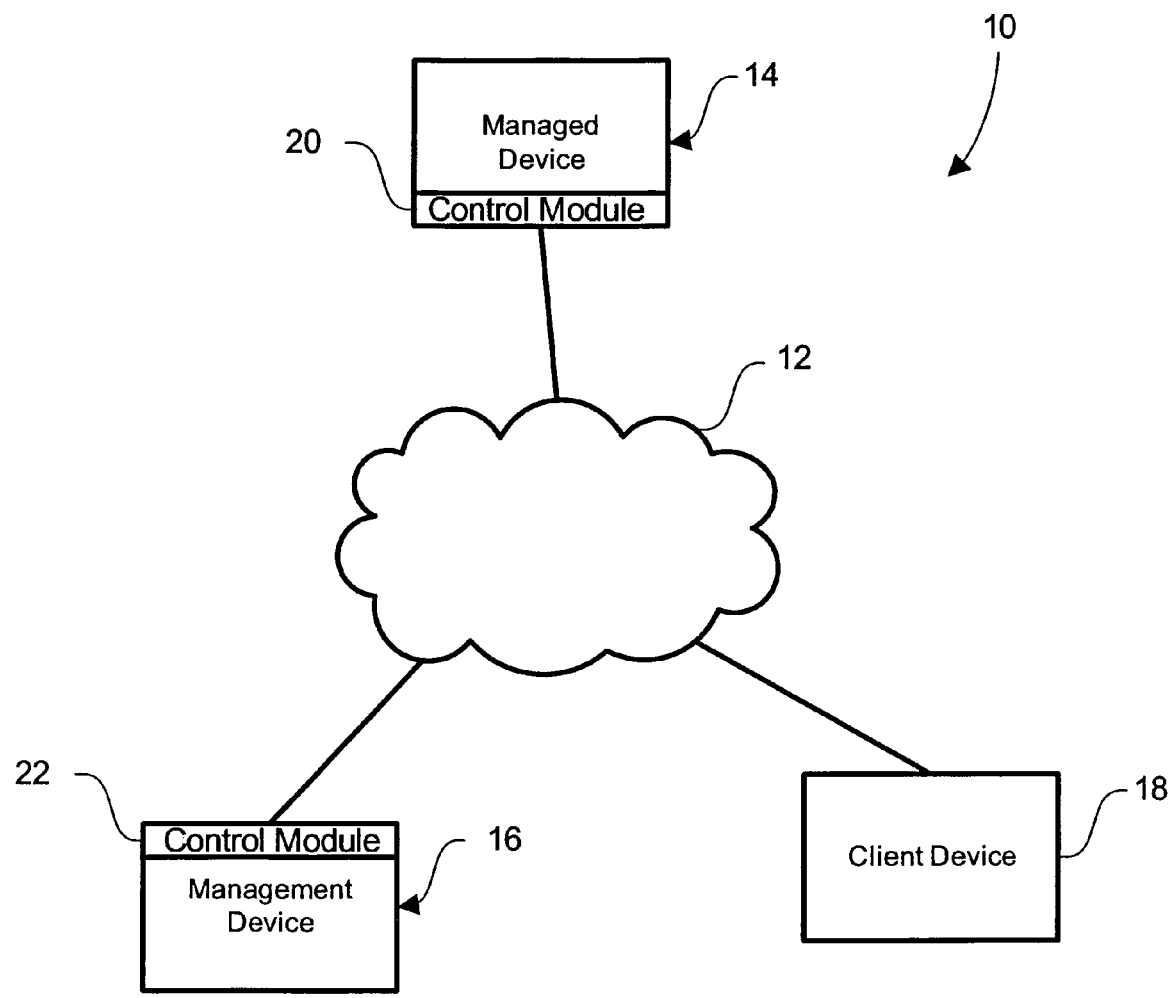
FIG. 1 is a block diagram of a system for delegating network management according to some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments. They are not intended as an exhaustive description of the invention or as a limitation on the scope of the invention. In addition, an illustrated embodiment may not show all aspects or advantages. An aspect or an advantage described in conjunction with a particular embodiment is not necessarily limited to that embodiment and can be practiced in any other embodiments, even if not so illustrated or described.

FIG. 1 illustrates a block diagram of a system 10 for managing a network attached device in accordance with some embodiments. As shown, the system 10 includes a network 12, a managed device 14, a management device 16, and a client device 18. In other embodiments, the system does not include the network 12. The managed device 14, the management device 16, and the client device 18, are each operatively connected to the network 12, thereby allowing communication between the devices 14, 16 and 18. As used in this specification, the term "managed device" refers to a device, for which or on behalf of which another device performs a function. Also, as used in this specification, the term "management device" refers to a device that performs a function for, or on behalf of, another device.

The network 12 may be a public network or private network, a single network or a combination of several networks, including wired and wireless networks. In some embodiments, the network 12 comprises the Internet. In other embodiments, the network 12 can be other networks, such as a local area network (LAN), the PSTN, a cable network, a cellular network, or combination thereof.

The managed device 14 and the management device 16 generally include hardware and/or software components for communicating through the network 12, as well as for other functionality. In the illustrated embodiments, the managed device 14 includes a managed device module 20, and the management device 16 includes a management device module 22. In some cases, the managed device module 20 and/or the management device module 22, may instruct one or more components of the associated device (e.g. the managed device 14 and/or the management device 16) to operate as described herein.

In some embodiments, the module 20/22 is a software application (e.g. operating system, browser application, micro-browser application, Web application, server application, proxy application, embedded application, tunneling application and/or other communication application) loaded on one or more devices that commands and directs the communication and management functions. In other embodiments, the module 20/22 includes a computer program, a piece of code, an instruction, another device, or some combination thereof. The control module 20/22 may be implemented, for example, as software code utilizing any suitable computer language (e.g. C, C++, Java or Perl) using object-oriented or structured techniques. In further embodiments, the control module 20/22 may be a computer, such as a workstation or PC, a microprocessor, a network server, a Java virtual machine, a programmable logic device or an application specific integrated circuit, using any suitable type of computer instructions.

The control module (i.e., the managed device module 20 and/or the management device module 22) may be embedded permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a general or special purpose computer system, such that if the storage media or device is read by the computer system, the functions described herein are performed.

In the illustrated embodiments, the managed device 14 is an network attached appliance, e.g. a firewall, which comprises hardware and software components. In some embodiments, the managed device 14 does not have a user interface, such as keyboard and display peripherals, for allowing a user to manage the managed device 14. In other embodiments, the managed device 14 has a user interface for allowing a user to manage the managed device 14. In other embodiments, the managed device 14 can be other devices or modules. As used in this specification, the word "network attached appliance" or "network attached device" refers to a device that is communicatively coupled to a network, and needs not be physically and directly connected to the network.

Figure 2:
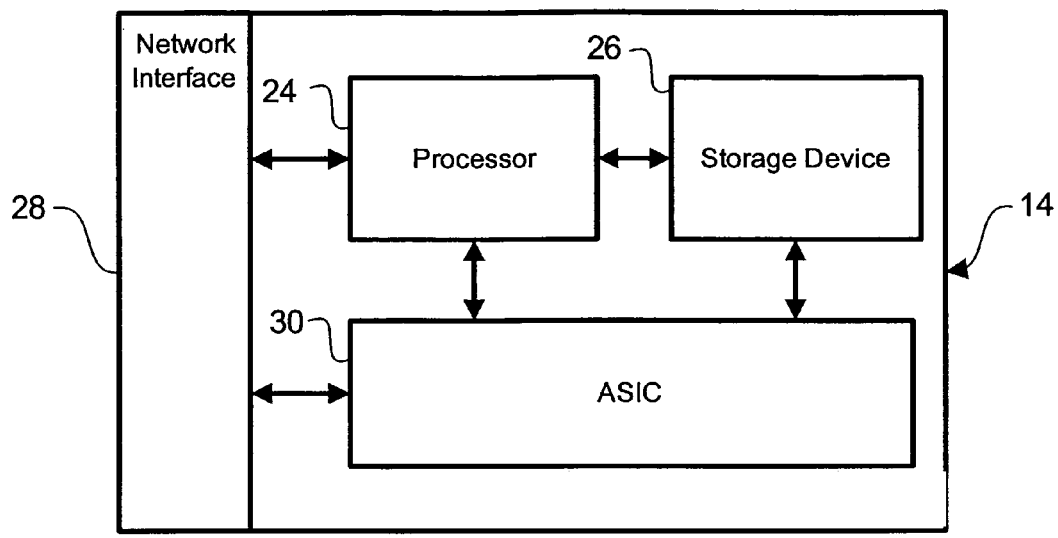
FIG. 2 is a block diagram of hardware components of a managed device of the system of FIG. 1 in accordance with some embodiments.

FIG. 2 illustrates the hardware components of the managed device 14 in accordance with some embodiments. As shown, the managed device 14 may include a processor 24, a storage device 26, a network interface 28 and an application specific integrated circuit (ASIC) 30. The network interface 28 allows a user to access the network 12. The ASIC 30 provides network appliance specific functionality, such as, real-time anti-virus, firewall, VPN, network intrusion detection and prevention, and traffic-shaping services.

Figure 3:
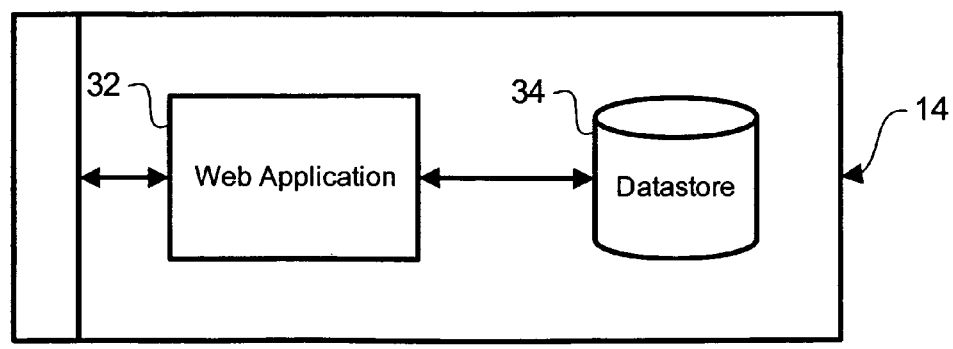
FIG. 3 is a block diagram of software components of a managed device of the system of FIG. 1 in accordance with some embodiments.

FIG. 3 illustrates the software components of the managed device 14 in accordance with some embodiments. As shown, the software components includes a Web application 32 and a data storage application 34, which are both stored on the storage device 26 and execute on the processor 24. The Web application 32 provides a network enabled management user interface for the managed device 14. The management user interface typically comprises an HTML web GUI application, although other suitable protocols may be used, for example, Java, SSH, XML, telnet, SNMP or any other protocol where management data is sent to and received from the managed device 14. In some embodiments, the management user interface is used to retrieve monitoring data and configuration data about the managed device 14. For example, if the managed device 14 is providing an anti-virus service then the monitoring data may comprise the type and frequency of virus infections, originating IP, e-mail address, etc., and the configuration data may comprise the types of files to block, types of files to scan, signature or set of signatures to use, protocol for handling oversize or compressed files, etc.

In the illustrated embodiments, the management device 16 may be an network attached appliance, which comprises hardware and software components. As an example, the management device 16 may be a logging and reporting appliance that aggregates and analyzes log data from one or more of the managed devices 14, and that produces reports relating to the log data. In one implementation in which the managed device 14 is a firewall, the log data may include byte or packet counts for TCP sessions, system events such as administrator actions, files scanned for viruses, and/or results of scanning. Alternatively, the management device 16 may include a server computer, and a network management software application. As an example, the network management software application on the server computer may comprise functionality for integrated management and monitoring of one or more of the managed devices 14. In a typical deployment, both the network attached appliance and the server computer configuration of the management device 16 could be used simultaneously.

In the illustrated embodiments, the management device 16 provides management functionality for the managed device 14. The management functionality may include, for examples, configuring the managed device 14 (e.g. for policies and routing), storing configuration information and meta-data related to the device 14, monitoring and alerting functionality, logging and content aggregation, and reporting. As an example of management functionality provided by the management device 16 to the managed device 14, consider the case when the managed device 14 is a network attached firewall appliance providing an anti-virus service. This situation requires that anti-virus definition (e.g., signature) updates be sent periodically to the managed device 14. The user can configure options about his preferences, e.g. what time of day to send the anti-virus definition updates, and these preferences can be stored on the management device 16. These preferences can be managed by the delegated management method described herein. As used in this specification, the term "management function" refers to a function that supports, or is associated with, an operation of the managed device 14, and therefore, needs not be limited to a function that "manages" data. Other examples of a management function includes log aggregation (e.g., storing of logs from multiple sources over a prescribed period), log analyzing (e.g., examining logs for patterns such as possible infected PCs or any other suspicious activity), log reporting (e.g., generating charts, tables, and/or graphs to display results of analysis to user), storing configuration information (e.g., storing backup or master copy of system configuration for one or more devices, including parameters that could be applied on a group level), storing meta-data (e.g., storing user preferences, inter-connections between nodes in a system, tracked changes to the configurations), monitoring (e.g., looking for abnormal conditions in real-time), or alerting (e.g., reporting monitoring data to user in real-time, such as by e-mail or SNMP traps).

Although one management device 16 and one managed device 14 are shown in the embodiments of FIG. 1, in other embodiments, the system 10 can include more than one management device 16 for providing management functionalities for the managed device 14. For example, the system 10 can include a first management device 16 for providing a first management function for the managed device 14, and a second management device 16 for providing a second management function for the managed device 14, wherein the first and the second management functions may or may not be the same. In further embodiments, the system 10 can include more than one managed devices 14 that are managed by one or more management devices 16.

Figure 4:
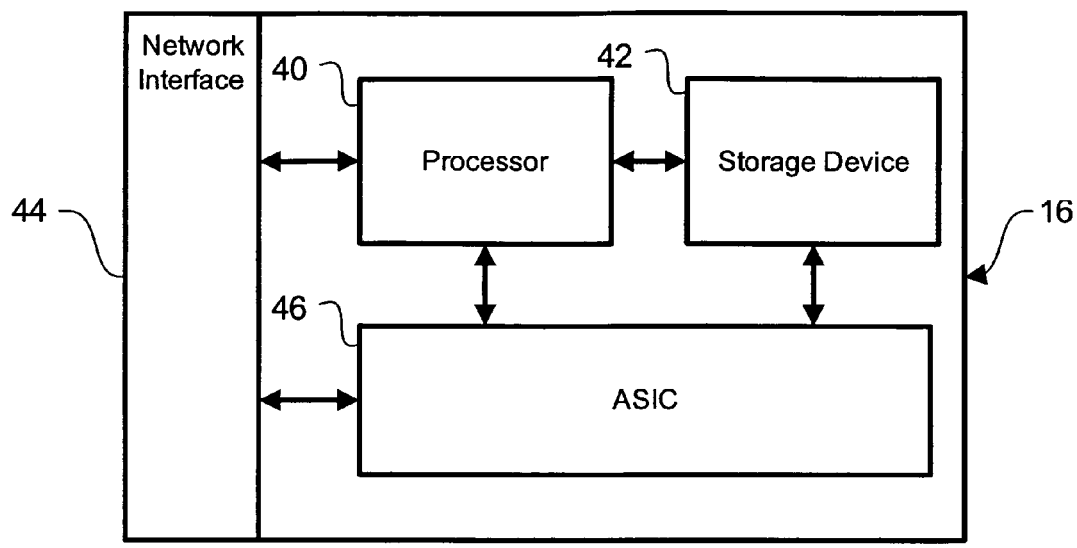
FIG. 4 is a block diagram of hardware components of a management device of the system of FIG. 1 in accordance with some embodiments.

FIG. 4 illustrates the hardware components of the management device 16 in accordance with some embodiments. The hardware components include a processor 40, a storage device 42, a network interface 44 and an application specific integrated circuit (ASIC) 46. The network interface 44 provides access to the network 12. The ASIC 46 provides network appliance specific functionality, such as, logging and content aggregation, and reporting.

Figure 5:
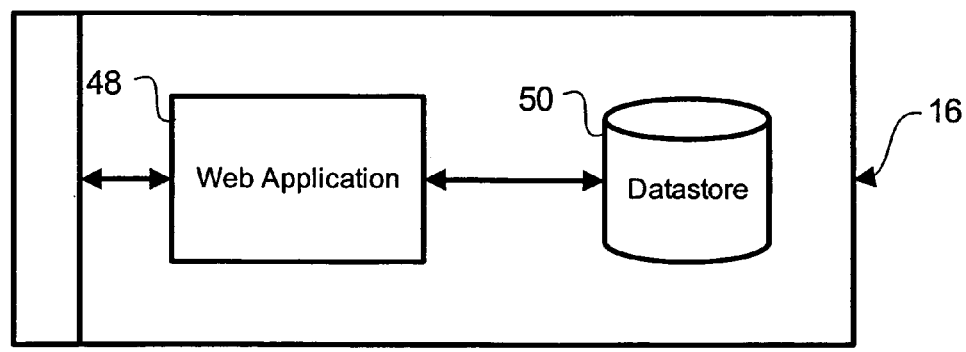
FIG. 5 is a block diagram of software components of a management device of the system of FIG. 1 in accordance with some embodiments.

FIG. 5 illustrates the software components of the network attached appliance configuration of the management device 16 in accordance with some embodiments. The software components include a management service comprising a Web application 48 and a data storage application 50. Both the Web application 48 and the data storage application 50 are stored on the storage device 42 and execute on the processor 40. The Web application 48 provides a network enabled management user interface for one or more of the managed device 14, as will be explained in more detail below. The management user interface may comprise, for example, an HTML web GUI application, although other suitable protocols, such as, Java, SSH, XML, telnet, SNMP or any other protocol where management data is sent to and received from the management device 16, may also be used in other embodiments. The management user interface is used to retrieve monitoring and configuration data about one or more of the managed device 14.

The managed device 14, (e.g., the firewall) and the management device 16 (e.g., the logging and reporting appliance) may have a long term connection between them, which may be a secure connection, e.g. an IPsec connection. For example, log messages may be securely exchanged between the firewall (i.e., managed device 14) and the logging and reporting appliance (i.e., management device 16).

It should be noted that the managed device 14 and the management device 16 are not limited to the embodiments described, and that the managed device 14 and the management device 16 can have other configurations in other embodiments. For example, in other embodiments, either or both of the devices 14, 16 need not include an ASIC processor. In such cases, a general purpose processor may be used instead. In other embodiments, the device 14/16 can be implemented using a desktop computer or a laptop. In further embodiments, the device 14/16 can be any of a variety of circuits or devices capable of performing the functions described herein. In other embodiments, the device 14/16 can be a component of a gateway (e.g., a firewall), or a separate component that is coupled to a gateway.

The client device 18 can be a computer, e.g. workstation or personal computer, which runs a software application for allowing an administrator to access both the managed device 14 and the management device 16. The personal computer can be a desktop, a laptop, a notebook or a tablet PC. The software application can be, for example, a web browser, e.g. Internet Explorer or Netscape browsers, but can also be other client applications in other embodiments. In other embodiments, the client device 18 can be other devices, e.g. a personal digital assistant (PDA), cell phone or Blackberry device. As used herein, the administrator is any person who administers, manages and uses the managed device.

In the system 10 shown in FIG. 1, the managed device 14 and the management device 16 has fixed IP addresses, or fixed uniform resource locators (URLs), and the client device 18 has a dynamic IP address. In this scenario, the administrator would be able to connect to the managed device 14 and the management device 16 from any arbitrary client device 18, such as in a work place, on the road, or at home. In other embodiments, the devices 14, 16 and 18 all have fixed IP addresses. In further embodiments, none of the devices 14, 16, and 18 has fixed IP address. In other embodiments, the devices 14, 16, 18 can have other combination of fixed/dynamic IP addresses. If the devices 14 and 16 do not have fixed IP addresses, then the client device 18 would need to locate IP addresses for the devices 14 and 16, for example, on a routing server on the Internet that comprises an IP address table for these devices.

In the illustrated embodiments, both the managed device 14 and the management device 16 have administrative accounts for users to logon and perform management functions. These administrative accounts are each associated with a set of permissions. On the management device 16, the permissions may relate to the administrator's ability to manage one or more managed devices 14.

Embodiments of the operation of delegating management from the managed device 14 to the management device 16 is now discussed. When an administrator from the client device 18 logs on to an administrator account on the managed device 14 and begins a management session, the managed device 14 can delegate the management session to the management device 16, thereby establishing a delegated management session on the management device 16. It is not necessary that the administrator accounts, or permissions thereof, are synchronized between the managed device 14 and the management device 16, since the managed device 14 can delegate whatever permissions it deems appropriate to the management device 16, as long as they do not interfere with the management device's 16 local policy.

In those embodiments where the administrator of the managed device 14 does not have an administrative account on the management device 16, the managed device 14 may pre-authorize a logon on the management device 16 to allow the administrator access to the management device 16. This involves the managed device 14 exchanging information about the management session with the management device 16, which may be accomplished in a number of ways, as described herein.

After the administrator logged on to the administrative account on the managed device 14, the client device 18 is redirected to the management device 16, where the administrator is automatically logged onto a delegated administrative account. In some embodiments, the delegated administrative account is an auto-generated temporary account, or ephemeral logon account, created on behalf of the managed device 14 and lasting only as long as the delegated management session, or as dictated by a limited validity delegated management session window. In other embodiments, the delegated administrative account is related to an existing administrative account on the management device 16. Still in other embodiments, an auto-generated persistent administrative account created on the management device 16 by the managed device 14 may be used as a bootstrapping mechanism to setup a permanent account on the management device 16.

The delegated management session on the management device 16 uses a delegated management user interface, which uses permissions that the managed device 14 can influence. The delegated management user interface provides a sandbox environment, on the management device 16, in which a subset of the administrative account features of either the managed device 14 or the management device 16 are available. More particularly, all or some functionalities not related to the managed device 14 is disabled. In some embodiments, the delegated management user interface may provide functionality not available through the regular management interface of the management device 16.

In some embodiments, the layout of the management user interface on the management device 16 may be altered during delegated management in order for it to resemble (e.g. look and feel the same as) the management interface on the managed device 14. This is to provide the illusion to the administrator that the delegated management user interface is running on the managed device 14 itself. In some embodiments, this may be done by passing a style sheet from the managed device to the management device. Alternatively, the management device may be pre-programmed to provide an user interface layout that resembles that of the managed device 14.

Figure 6:
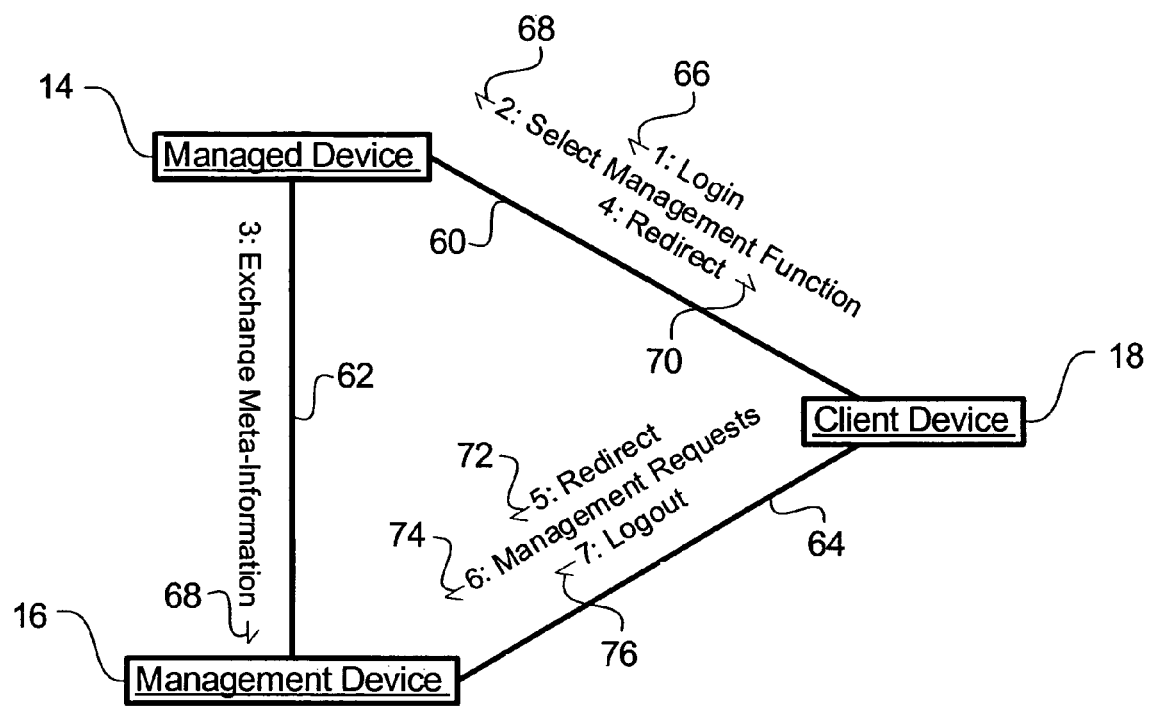
FIG. 6 is a collaboration diagram of the system of FIG. 1 in accordance with some embodiments.

Referring next to FIG. 6, there is shown a collaboration diagram of the system 10, which illustrates messages exchanged between the client device 18, the managed device 14 and the management device 16 during the delegated management process, in accordance with some embodiments. The client device 18 communicates over the communication channel 60 through the network 12 with the managed device 14. Similarly, the managed device 14 communicates with the management device 16 over the communication channel 62 through the network 12, and the client device 18 communicates with the management device 16 over the communication channel 64 through the network 12. The communication channels 60, 62 and 64 are preferably secure communications channels, e.g. IPSec tunnel, SSL, SSH or HTTPS, or perhaps an out-of-band connection, however this is not a requirement. The devices 14, 16 and 18 exchange messages over the communication channels 60, 62 and 64 using any suitable communication protocol, for example TCP/IP, UDP/IP and HTTP.

Figure 7:
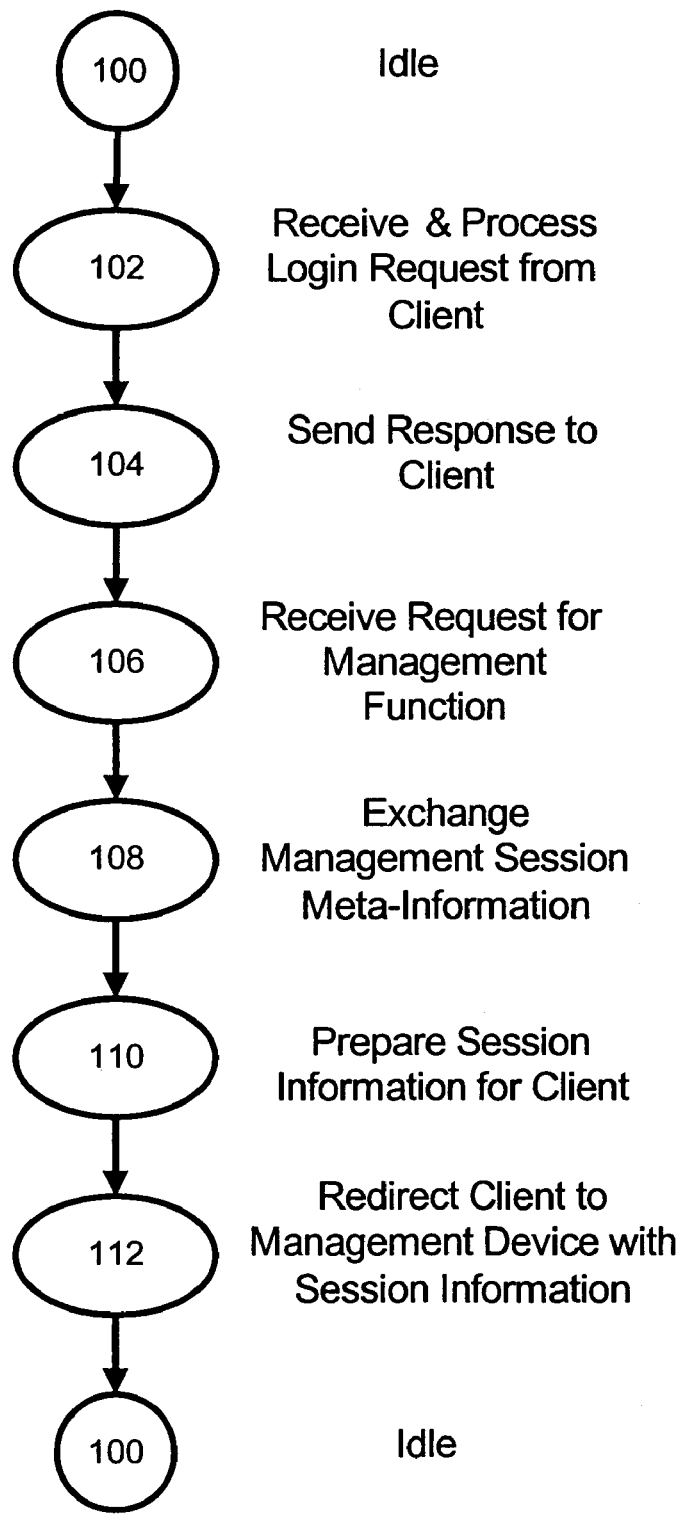
FIG. 7 is a flowchart diagram illustrating an operation of the managed device of the system of FIG. 1 in accordance with some embodiments.
Figure 8:
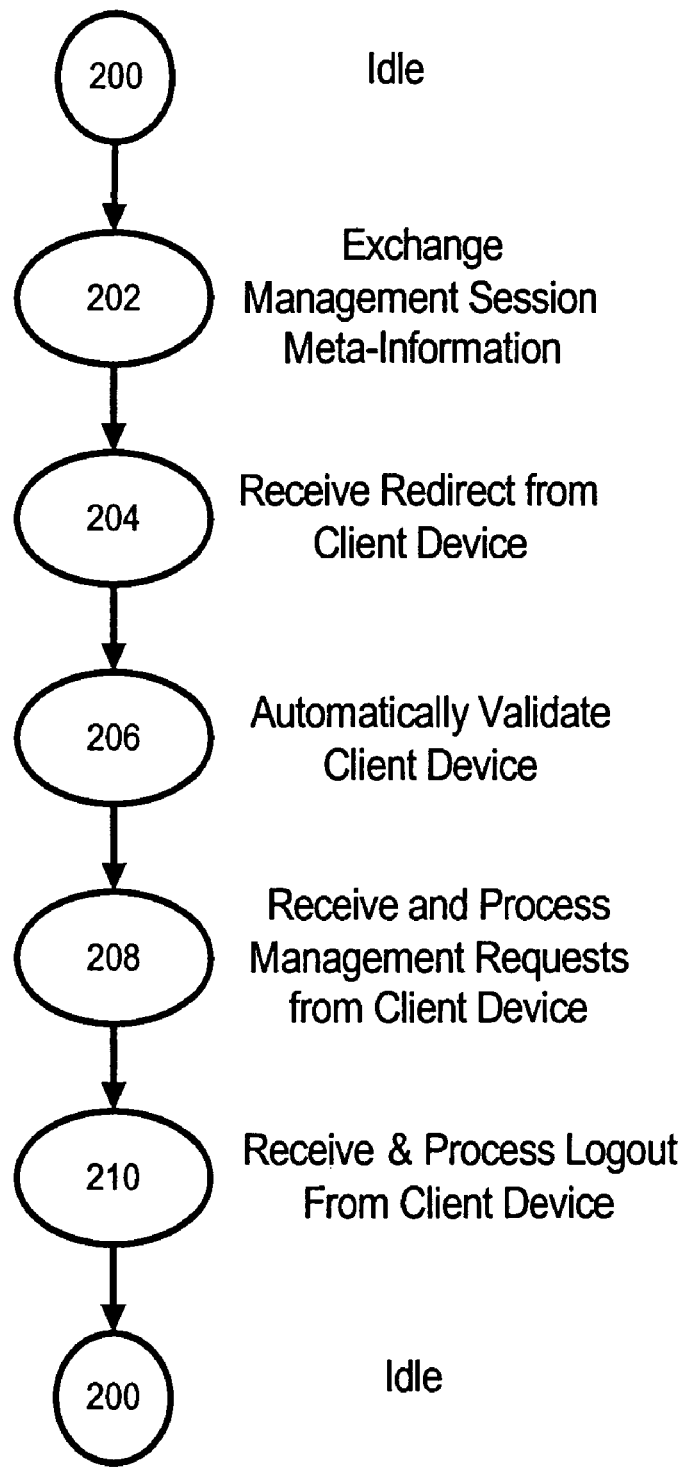
FIG. 8 is a flowchart diagram illustrating an operation of the management device of the system of FIG. 1 in accordance with some embodiments.

In the following discussion of the collaboration diagram of FIG. 6, reference is made to the flowchart diagrams of FIGS. 7 and 8 that represent simplified algorithms for delegated management as executed by the managed device 14 and the management device 16 respectively.

First, an administrator operating through the client device 18 enters a management user interface URL for the managed device 14 into a web browser application running on the client device 18. In response, the Web application 32 of the managed device 14 serves up a logon page to the client device 18. The administrator enters, for example, a username and password into the logon page, and then submits the logon page to the Web application 32 as message 66. The Web application 32 of the managed device 14 processes the logon in step 102 (see FIG. 7) by validating the username and password entered by the administrator, thereby establishing a session on the managed device 14. If validated, the Web application 32 then serves a management user interface page, i.e. an HTML page, back to the client device 18 in step 104.

The administrator selects a management function for the managed device 14 by sending message 68 to the Web application 32 of the managed device 14, in this example by selecting a hyperlink within the management user interface page. The Web application 32 receives the request for the management function in step 106, thereby establishing a management session, and begins the process of delegating the management session to the management device 16.

The managed device 14 and the management device 16 exchange meta-information messages 68 about the management session over the communication channel 62 in steps 108 and 202 respectively. This may involve creating an account on the management device 16, in which the administrator is later automatically logged onto to establish a delegated management session, or a delegated management session may be established immediately on the management device 16 that can recognize later communications from the client device 18, for example an incoming TCP/IP connection request or a redirect message. The managed device 14 may send the IP address of the client device 18 to the management device 16 so that the management device 16 can later recognize an incoming connection request from the client device 18. In other embodiments, such step is not necessary, and is not performed. For example, the above described step is not performed is a cookie or redirect URL approach is used.

The managed device 14 may also exchange a management session policy including a set of permissions that are used in the delegated management session on the management device 16. Other information, such as, information related to the look and feel of the managed device 14 may be exchanged in the form of a style sheet, may also be exchanged.

The managed device 14 prepares meta-information related to the newly created account, or the existing account, or the delegated management session on the management device 16 in step 110. The meta-information may include a username and password for the newly created account or the existing account, a unique session ID identifying the delegated management session established on the management device 16, or a temporary certificate. The meta-information may be time and date stamped, by the managed device 14, to provide a limited temporal window of validity to the meta-information. The managed device 14 may also encrypt and/or digitally sign the meta-information, independent of whether the communication channels 60 and 64 are secure.

The managed device 14 sends a redirect message 70 that includes the meta-information to the client device 18 in step 112, which redirects the client device 18 to the management device 16. The meta-information may be, for example, a cookie stored in a file on the client device 18, or may be included as part of a redirect URL in the redirect message 70.

The client device 18 relays the redirect message 70 to the management device 16, or a part thereof, as redirect message 72, which is received by the management device 16 in step 204. The client device 18 is redirected to the management device 16 with the above mentioned meta-information so that the management device 16 may automatically recognize the client device 18. In step 206, the management device 16 either logs on the administrator automatically to the newly created account or to an existing account, or validate the client device 18 to access the delegated management session already in progress, without requiring any involvement from the administrator. In some embodiments, the administrator does not know that a redirect to the management device 16 has taken place.

The client device 18 can then send further management requests, related to the managed device 14, as messages 74 to the management device 16, which are processed by the management device 16 in step 208. In some situations, the management device 16 can send messages to the managed device 14 over communication channel 62 during the delegated management session for configuration function (e.g., for configuring which traffic flows to scan, whether to log AV results, and/or whether to block, pass, or quarantine the files), depending upon the management functions selected by the administrator. The communication channel 62 may be a long term communication channel, or may be connected and disconnected as required.

The administrator logs out of the management device 16 by sending message 76 after the delegated management session is completed. The management device 16 receives the logout message 76 and terminates the delegated management session in step 210. In some embodiments the managed device 14 may be notified by the management device 16 that the delegated management session has completed, although this is not a requirement.

Figure 9:
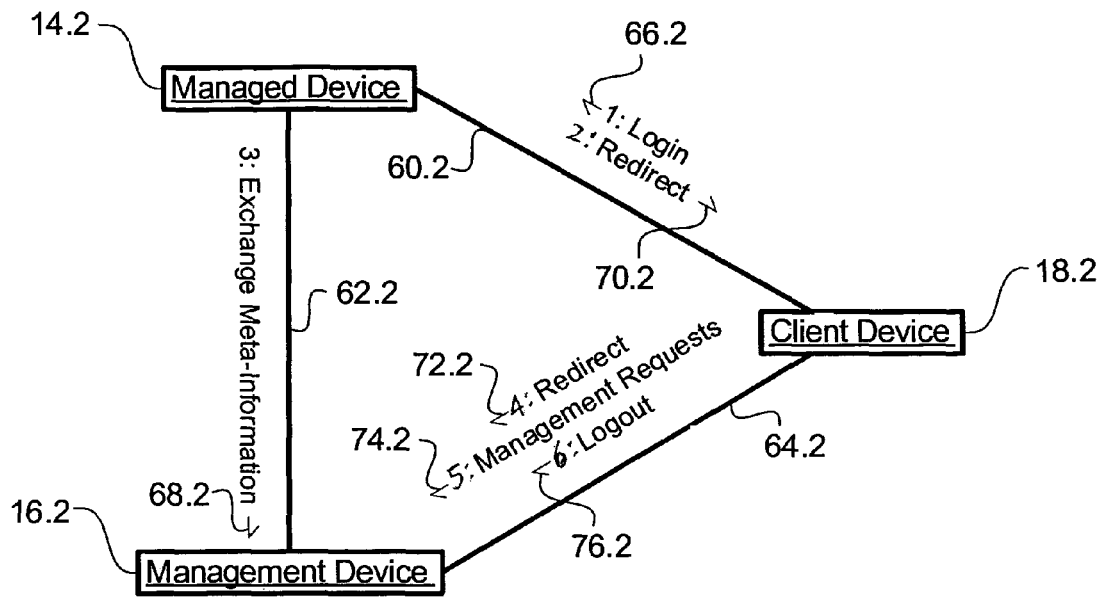
FIG. 9 is a collaboration diagram of a system for delegating management according to other embodiments.

Referring now to FIG. 9, there is shown a collaboration diagram in accordance with other embodiments, wherein like parts to the previous embodiment have like references numerals with an additional suffix "0.2". The collaboration diagram of FIG. 9 is similar to that of FIG. 6 and only the differences are discussed. In this embodiment, when an administrator acting through a client device 18.2 logs onto a managed device 14.2, the managed device 14.2 immediately begins the delegated management procedure. In this embodiment, the administrator does not need to select a particular management function after logon for the delegated management procedure to begin.

In this embodiments, all management functionalities are delegated to a management device 16.2. This is advantageous when the managed device is a lightweight embedded device with limited resources, and the requirements of a management user interface are not congruent to a resource constrained environment.

Figure 10:
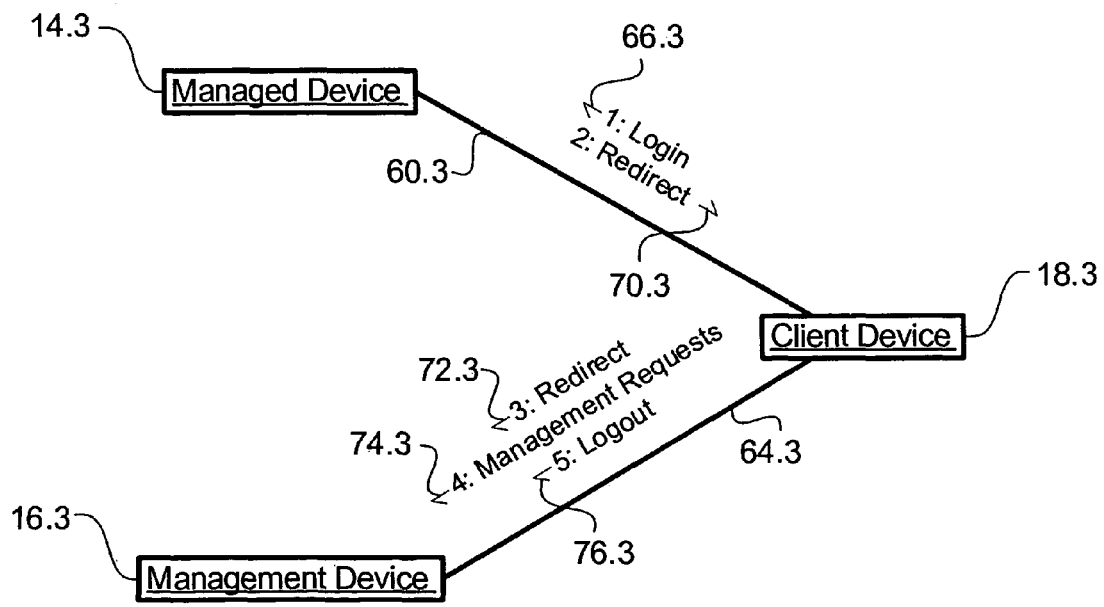
FIG. 10 is a collaboration diagram of a system for delegating management according to other embodiments.

Referring now to FIG. 10, there is shown a collaboration diagram in accordance with other embodiments, wherein like parts to the previous embodiment have like references numerals with an additional suffix "0.3". The collaboration diagram of FIG. 10 is similar to that of FIGS. 6 and 9 and only the differences are discussed. In the present embodiment, an administrator acting through a client device 18.3 logs onto a managed device 14.3. The managed device 14.3 begins to delegate management to a management device 16.3 either immediately after login, or after the administrator selects a management function.

In the illustrated embodiments, however, the managed device 14.3 does not need to exchange meta-information about the management session directly with the management device 16.3. Instead, all the meta-information about the management session required by the management device 16.3 is included in redirect messages 70.3 and 72.3. The meta-information included in the redirect message from the managed device 14.3 may comprise, for examples, a username and password for an existing account on the management device 16.3, or a request to establish an ephemeral logon.

In some embodiments, the meta-information may be time and date stamped by the managed device 14.3 in order to allow only a limited temporal window in which the redirect messages 70.3 and 72.3 are valid. The managed device 14.3 may also encrypt and/or digitally sign, e.g. using a public key infrastructure, the meta-information contained within the redirect messages 70.3 and 72.3, so that the management device may verify the authenticity of the redirect messages.

In some situations during the delegated management session, the management device 16.3 may establish a connection to the managed device 14.3 in order to perform management and/or configuration functions, as requested by the administrator.

It should be noted that the orders of the communication between devices shown in FIGS. 6, 9, 10 need not be that shown, and that the orders can be different in other embodiments.

As illustrated, embodiments of the system 10 is advantageous in that a requested management service or a requested function can be provided to a user when the managed device 14 has limited resources for providing such management service or function. Embodiments of the system 10 described herein also has the advantage of providing a seamless delegation of management of the managed device 14 that requires no involvement of an administrator, who is requesting a management function. Still a further advantage of the embodiments is the simplification of deploying a managed device. For example, in some embodiments, the administrator only needs to log on to the managed device 14, and is not required to perform a separate log on for accessing the management device 16. The managed device 14 can set up whatever permissions are required on the management device 16 for a delegated management session. This is especially advantageous when there are more than one management devices 16 that are used to manage the managed device 14.

Computer Architecture

As described previously, any of the managed device 14, management device 16, and the client device 18, can be implemented using a computer. For example, one or more instructions can be imported into a computer to enable the computer to perform any of the functions described herein.

Figure 11:
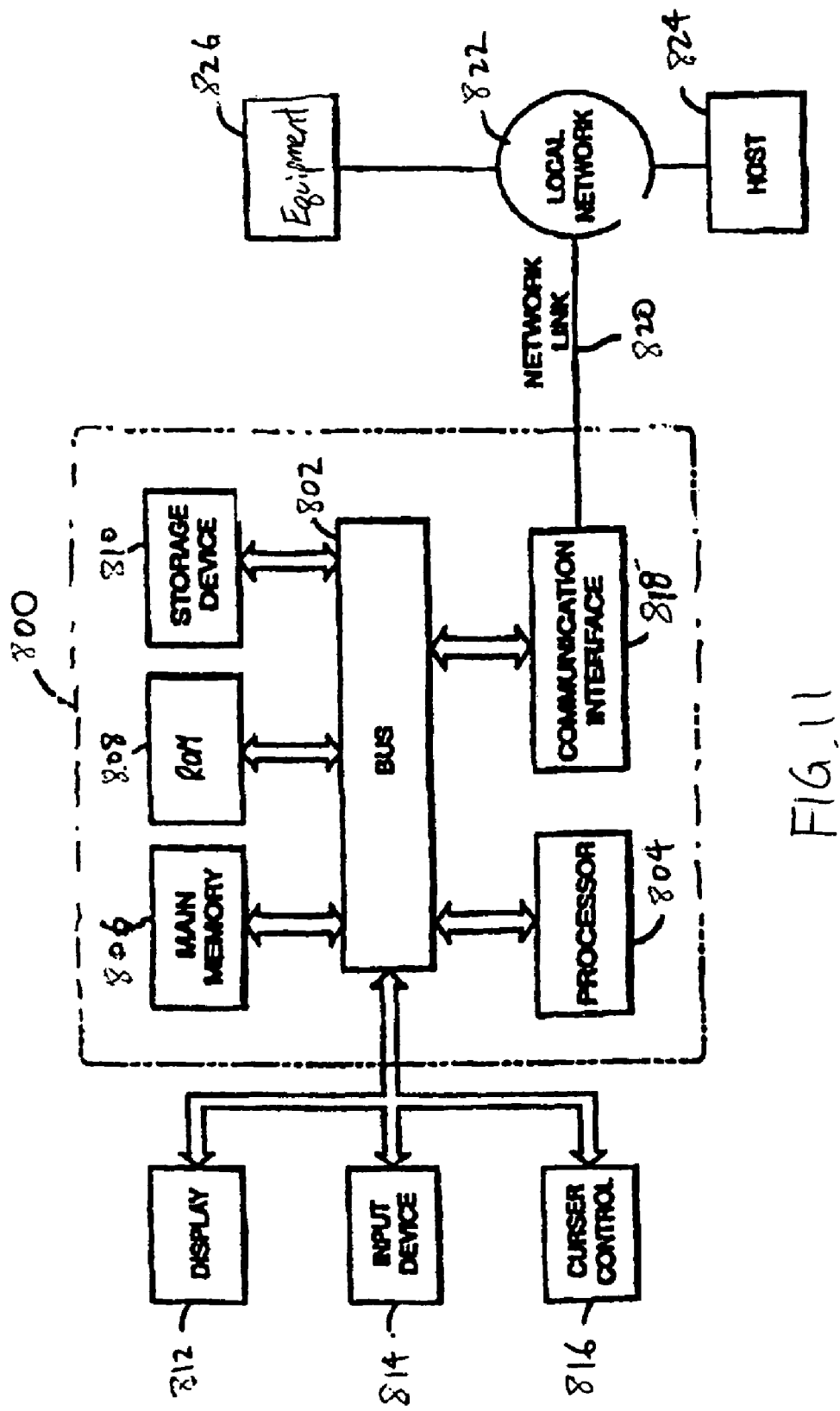
FIG. 11 illustrates a diagram of a computer hardware system that can be used to perform various functions described herein in accordance with some embodiments.

FIG. 11 is a block diagram that illustrates an embodiment of a computer system 800 upon which embodiments of the managed device 14, management device 16, and the client device 18 may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 may further include a read only memory (ROM) 808 or other static storage device (s) coupled to bus 802 for storing static information and instructions for processor 804. A data storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a user. An input device 814, including alphanumeric and other keys, is coupled to bus 802 for communicating information and command selections to processor 804. Another type of user input device is cursor control 816, such as a mouse, a trackball, cursor direction keys, or the like, for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Embodiments described herein are related to the use of computer system 800 for transmitting, receiving, and/or processing electronic data. According to some embodiments, such use may be provided by computer system 800 in response to processor 804 executing one or more sequences of one or more instructions contained in the main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement various operations/functions described herein. Thus, embodiments are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry data streams representing various types of information.

Network link 820 typically provides data communication through one or more networks to other devices. For example, network link 820 may provide a connection through local network 822 to a host computer 824. Network link 820 may also transmits data between an equipment 826 and communication interface 818. The data streams transported over the network link 820 can comprise electrical, electromagnetic or optical signals. The signals through the various networks and the signals on network link 820 and through communication interface 818, which carry data to and from computer system 800, are exemplary forms of carrier waves transporting the information. Computer system 800 can send messages and receive data, including program code, through the network (s), network link 820, and communication interface 818. Although one network link 820 is shown, in alternative embodiments, communication interface 818 can provide coupling to a plurality of network links, each of which connected to one or more local networks. In some embodiments, computer system 800 may receive data from one network, and transmit the data to another network. Computer system 800 may process and/or modify the data before transmitting it to another network.

Although particular embodiments have been shown and described, it will be understood that it is not intended to limit the present inventions to the embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for providing a management function requested by a user that uses a managed device, comprising:
   establishing a session on a managed device with a client device in response to a user logging into an account on the managed device using the client device;

establishing a delegated management session on a management device with the client device, the delegated management session corresponding to the session on the managed device, wherein the delegated management session is established in response to the login received by the managed device;

wherein the step of establishing the delegated management session on the management device comprises:

automatically logging the user into an account on the management device; and redirecting the user from the managed device to the management device;

receiving a management message on the management device, the management message being related to a management function requested by the user; and in response to the received management message, performing the management function using the management device;

wherein the management function is associated with the managed device;

wherein the managed device is not configured to perform the management function;

wherein the management function includes at least one of a configuration function and a reporting function associated with the operation of the managed device performance, of the reporting function including:

aggregating log data from the managed device and other managed devices;

analyzing the aggregated log data for patterns to identify infected devices; and reporting based on the analyzing of the aggregated log data.

2. The method of claim 1, wherein the managed device does not have sufficient resource to provide the management function.

3. The method of claim 1, further comprising receiving information related to the user on the management device.

4. The method of claim 3, wherein the information is received from the managed device.

5. The method of claim 3, wherein the information is received from the client device.

6. The method of claim 3 wherein the information comprises an IP address of the client device used by the user.

7. The method of claim 1, wherein the session on the managed device comprises a management session, and the step of establishing the session on the managed device further comprises receiving a selection of the management function on the managed device.

8. The method of claim 1, wherein the step of establishing the delegated management session on the management device further comprises creating the account on the management device.

9. The method of claim 1, wherein the step of redirecting comprises sending a delegated management session identifier to the management device.

10. The method of claim 8, wherein the account is terminated after the delegated management session is completed.

11. The method of claim 1, wherein the step of establishing the delegated management session on the management device comprises obtaining information related to an account on the management device.

12. The method of claim 11, wherein the information related to the account on the management device comprises at least one of a username, and a password, and a temporary certificate.

13. The method of claim 1, wherein the step of establishing the delegated management session on the management device comprises sending information related to the delegated management session from the managed device to the management device.

14. The method of claim 13, wherein the information related to the delegated management session comprises at least one of a delegated management session identifier, a username, a password, and a temporary certificate.

15. The method of claim 13, wherein the information related to the delegated management session comprises a cookie on a client device.

16. The method of claim 13, wherein the information related to the delegated management session comprises a portion of a URL.

17. The method of claim 1, wherein the management function comprises storing configuration information, storing meta-data, monitoring, or alerting.

18. The method of claim 1, further comprising passing a style sheet from the managed device to the management device.

19. A non-transitory computer-program product having a storage medium, the storage medium storing a set of instructions readable by a processor, wherein an execution of the instructions by the processor causes a process to be performed, the process comprising:

establishing a session on a managed device with a client device in response to a user logging into an account on the managed device using the client device;

establishing a delegated management session on a management device with the client device, the delegated management session corresponding to the session on the managed device, wherein the delegated management session is established in response to the login received by the managed device;

wherein the step of establishing the delegated management session on the management device comprises:

automatically logging the user into an account on the management device; and redirecting the user from the managed device to the management device;

receiving a management message on the management device, the management message being related to a management function requested by the user; and in response to the received management message, performing the management function using the management device;

wherein the management function is associated with the managed device;

wherein the managed device is not configured to perform the management function;

wherein the management function includes at least one of a configuration function and a reporting function associated with the operation of the managed device performance, of the reporting function including:

aggregating log data from the managed device and other managed devices;

analyzing the aggregated log data for patterns to identify infected devices; and reporting based on the analyzing of the aggregated log data.

* * * * *